(12) United States Patent
Nagori (10) Patent No.: US 8,270,727 B2
(45) Date of Patent: Sep. 18, 2012

(54) REDUCED CALCULATIONS IN DETERMINING INTRA-PREDICTION TYPE METHOD AND SYSTEM

(75) Inventor: Soyeb Nagori, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 13/222,384

(22) Filed: Aug. 31, 2011

(65) Prior Publication Data

US 2011/0311153 A1 Dec. 22, 2011

Related U.S. Application Data

(62) Division of application No. 12/056,331, filed on Mar. 27, 2008, now Pat. No. 8,031,946.

(51) Int. Cl.
*G06K 9/48* (2006.01)

(52) U.S. Cl. ........ 382/199; 382/176; 382/173; 382/190; 382/232; 382/302; 348/701; 348/607

(58) Field of Classification Search .................. 382/199, 382/176, 173, 190, 232, 302; 348/701, 607
See application file for complete search history.

(56) References Cited

U.S. PATENT DOCUMENTS

| | | | |
|---|---|---|---|
| 2004/0184669 A1* | 9/2004 | Tan et al. | 382/268 |
| 2006/0050783 A1* | 3/2006 | Le Dinh et al. | 375/240.2 |
| 2006/0146940 A1* | 7/2006 | Gomila et al. | 375/240.27 |

* cited by examiner

*Primary Examiner* — Mike Rahmjoo
(74) *Attorney, Agent, or Firm* — Robert D. Marshall, Jr.; Wade James Brady, III; Frederick J. Telecky, Jr.

(57) ABSTRACT

The method, system, and apparatus of source statistics based intra prediction type is disclosed. In one embodiment, a method includes classifying a four-pixel square block in an edge class (e.g., may include a DC edge class, a vertical edge class, a horizontal edge class, a diagonal edge class, and/or a planar edge class) based on an edge classifier, classifying an eight-pixel square block having the four-pixel square block and other four-pixel square blocks as a homogenous class if the four-pixel square block and the other four-pixel square blocks of the eight-pixel square block belong to the edge class, assigning a direction to the edge class of the eight-pixel square block, and determining an optimal intra-prediction type through the classification such that empirical testing of all possible ones of the edge class and the direction is avoided when the homogenous class is identified.

10 Claims, 10 Drawing Sheets

REDUCED CALCULATIONS IN DETERMINING INTRA-PREDICTION TYPE METHOD AND SYSTEM

This application is a divisional of U.S. patent application Ser. No. 12/056,331 filed Mar. 27, 2008 now U.S. Pat. No. 8,031,946.

FIELD OF TECHNOLOGY

This disclosure relates generally to an enterprise method, a technical field of software and/or hardware technology and, in one example embodiment, to a method and system of reduced calculations in determining intra-prediction type.

BACKGROUND

A frame (e.g., a first frame) of a video data may use an intra-predictive process (e.g., in the H.264 standard) to determine similarities between a set of pixels in the frame (e.g., constituting a block, a macro-block, etc.) with their surrounding pixels. The intra-predictive process may be used to predict values (e.g., luminance, YUV, etc.) of the set of pixels. To determine the optimal predictive mode (e.g., DC, Vertical, Horizontal, Diagonal, Planar, etc.), all possible predictive modes may need to empirically tested (e.g., 184 possible modes may need to be tested in the H.264 standard to determine the best mode for each macro-block). This may cause delays and other inefficiencies (e.g., processing overloads).

SUMMARY

The method, system, and apparatus of source statistics based intra prediction type are disclosed. In one aspect, a method includes classifying a four-pixel square block in an edge class (e.g., may include a DC edge class, a vertical edge class, a horizontal edge class, a diagonal edge class etc.) based on an edge classifier, classifying an eight-pixel square block having the four-pixel square block and other four-pixel square blocks as a homogenous class if the four-pixel square block and the other four-pixel square blocks of the eight-pixel square block belong to the edge class, assigning a direction to the edge class of the eight-pixel square block, and determining an optimal intra-prediction type through the classification such that empirical testing of all possible ones of the edge class and the direction is avoided when the homogenous class is identified.

The method may include selecting a macro-block type as a sixteen-pixel square block when the eight-pixel square block and other eight-pixel square blocks forming the sixteen-pixel square block are homogeneous and have the edge class. The method may assign the edge class and the direction to the sixteen-pixel square block without empirically testing of all possible ones of the edge class and the direction on the sixteen-pixel square block. The method may use the sixteen-pixel square block direction as the eight-pixel square block direction.

In addition, the method may include observing that the sixteen-pixel square block is preferred in a flat region, a four-pixel square block is preferred in a high detail region, a eight-pixel square block is preferred in a moderate detail region of an image. The method may also classify a particular region of the image in the intra-prediction type based on knowledge of whether the particular region is one of the flat region, the high detail region, and the moderate detail region. The method may select the macro-block type as the eight-pixel square block when the other eight-pixel square blocks forming the sixteen-pixel square block have a different edge class. The method may classify the eight-pixel square block having the four-pixel square block and other four-pixel square blocks as a heterogeneous class if the four-pixel square block and the other four-pixel square blocks of the eight-pixel square block do all not belong to the edge class. The method may select a macro-block type as the four-pixel square block when the eight-pixel square block is classified in the heterogeneous class.

A method includes determining that a sixteen-pixel square block is preferred in a flat region of an image, determining that a four-pixel square block is preferred in a high detail region of the image, determining that a eight-pixel square block is preferred in a moderate detail region of the image, and classifying a particular region of the image in an intra-prediction type based on knowledge of whether the particular region is one of the flat region, the high detail region, and the moderate detail region.

The intra-prediction type may determine an edge class and a direction of the edge class of the particular region. The edge class may be a DC edge class, a vertical edge class, a horizontal edge class, a diagonal edge class. The method may include classifying the four-pixel square block in the edge class based on an edge classifier. The method may also include selecting a macro-block type as the sixteen-pixel square block when the eight-pixel square block and other eight-pixel square blocks forming the sixteen-pixel square block are homogeneous and have the edge class. The method may assigning the edge class and the direction to the sixteen-pixel square block without empirically testing of all possible ones of the edge class and the direction on the sixteen-pixel square block. The method may also select the macro-block type as the eight-pixel square block when the other eight-pixel square blocks forming the sixteen-pixel square block have a different edge class.

The method may include classifying the eight-pixel square block having the four-pixel square block and other four-pixel square blocks as a heterogeneous class if the four-pixel square block and the other four-pixel square blocks of the eight-pixel square block do all not belong to the edge class. The method may select a macro-block type as the four-pixel square block when the eight-pixel square block is classified in the heterogeneous class.

A system includes a processor communicatively coupled to a memory and a storage device. An intra-prediction module associated with the processor may classify a four-pixel square block in an edge class (e.g., may include a DC edge class, a vertical edge class, a horizontal edge class, a diagonal edge class, and/or a planar edge class) based on an edge classifier. The intra-prediction module may classify an eight-pixel square block having the four-pixel square block and other four-pixel square blocks as a homogenous class if the four-pixel square block and the other four-pixel square blocks of the eight-pixel square block belong to the edge class, and may assign a direction to the edge class of the eight-pixel square block. In addition, the intra-prediction module may determine an optimal intra-prediction type through the classification such that empirical testing of all possible ones of the edge class and the direction is avoided when the homogenous class is identified.

The intra-prediction module may select a macro-block type as a sixteen-pixel square block when the eight-pixel square block and other eight-pixel square blocks forming the sixteen-pixel square block are homogeneous and have the edge class, and may assign the edge class and the direction to the sixteen-pixel square block without empirically testing of all possible ones of the edge class and the direction on the sixteen-pixel square block. The intra-prediction module may observe that the sixteen-pixel square block is preferred in a flat region, a four-pixel square block is preferred in a high detail region, a eight-pixel square block is preferred in a moderate detail region of the image. The system may classify a particular region of the image in the intra-prediction type based on knowledge of whether the particular region is one of the flat region, the high detail region, and the moderate detail region.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The method, system, and apparatus of source statistics based intra prediction type is disclosed. Although the present embodiments have been described with reference to specific example embodiments, it will be evident that various modifications and changes may be made to these embodiments without departing from the broader spirit and scope of the various embodiments.

Figure 2:
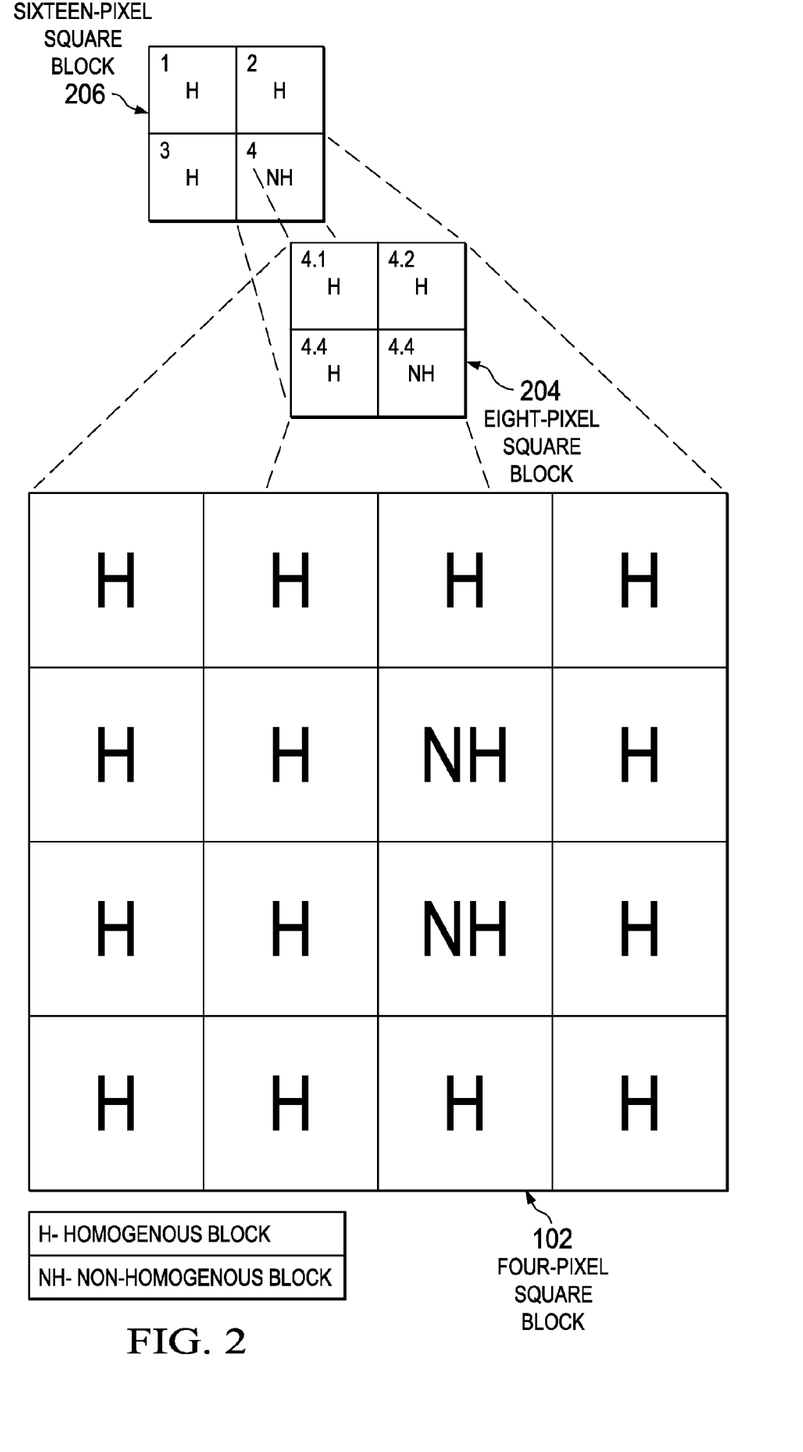
FIG. 2 is an exploding view of macro block illustrating heterogeneity, according to one embodiment.
Figure 3:
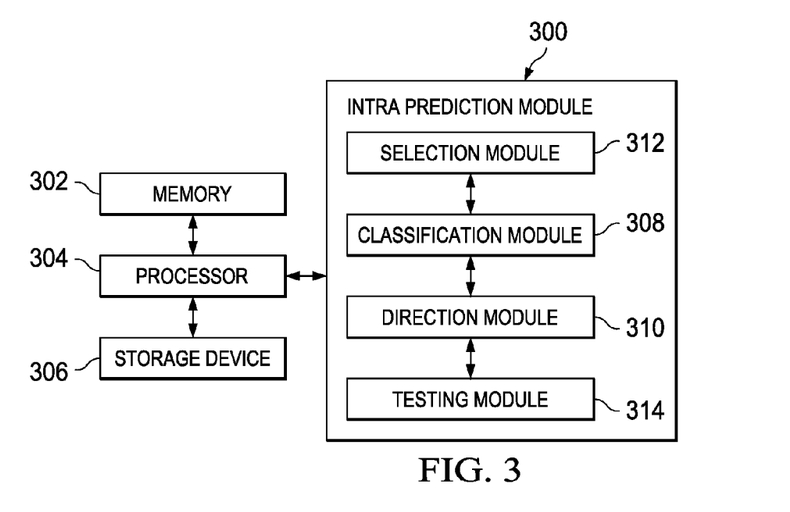
FIG. 3 is a system view illustrating the process of intra-prediction according to one embodiment.

In one embodiment, a method includes, classifying a four-pixel square block (e.g., the four-pixel square block 102 and 602 of FIG. 1 and FIG. 6) in an edge class based on an edge classifier, classifying an eight-pixel square block (e.g., the eight-pixel square block 204 and 604 of FIG. 2 and FIG. 6) having the four-pixel square block 602 and other four-pixel square blocks as a homogenous class if the four-pixel square block 102 and the other four-pixel square blocks of the eight-pixel square block 604 belong to the edge class (e.g., using the classification module 308 of FIG. 3), assigning a direction to the edge class of the eight-pixel square block 204 (e.g., using the direction module 310 of FIG. 3), and determining an optimal intra-prediction type through the classification such that empirical testing of all possible ones of the edge class and the direction is avoided when the homogenous class is identified (e.g., using the intra-prediction module 300 of FIG. 3).

In another embodiment, a method includes determining that a sixteen-pixel square block (e.g., the sixteen-pixel square block 206 and 606 of FIG. 2 and FIG. 6) is preferred in a flat region of an image, determining that a four-pixel square block (e.g., the four-pixel square block 102 and 606 of FIG. 1 and FIG. 6) is preferred in a high detail region of the image, determining that a eight-pixel square block (e.g., the eight pixel-square block 204 and 604 of FIG. 2 and FIG. 6) is preferred in a moderate detail region of the image, and classifying a particular region of the image in an intra-prediction type based on knowledge of whether the particular region is one of the flat region, the high detail region, and the moderate detail region (e.g., using the intra-prediction module 300 of FIG. 3).

In yet another embodiment, a system includes a processor (e.g., the processor 304 of FIG. 3) communicatively coupled to a memory (e.g., the memory 302 of FIG. 3) and a storage device (e.g., the storage device 306 of FIG. 3), and an intra-prediction module (e.g., the intra-prediction module 300 of FIG. 3) associated with the processor 304 to classify a four-pixel square block (e.g., the four-pixel square block 602 of FIG. 6) in an edge class based on an edge classifier, to classify an eight-pixel square block (e.g., the eight-pixel square block 604 of FIG. 6) having the four-pixel square block 602 and other four-pixel square blocks as a homogenous class if the four-pixel square block 604 and the other four-pixel square blocks of the eight-pixel square block 604 belong to the edge class, to assign a direction to the edge class of the eight-pixel square block 604 (e.g., using the direction module 310 of FIG. 3), and to determine an optimal intra-prediction type through the classification such that empirical testing of all possible ones of the edge class (e.g., using the testing module 312 of FIG. 3) and the direction is avoided when the homogenous class is identified (e.g., using the intra-prediction module 300 of FIG. 3).

Figure 1:
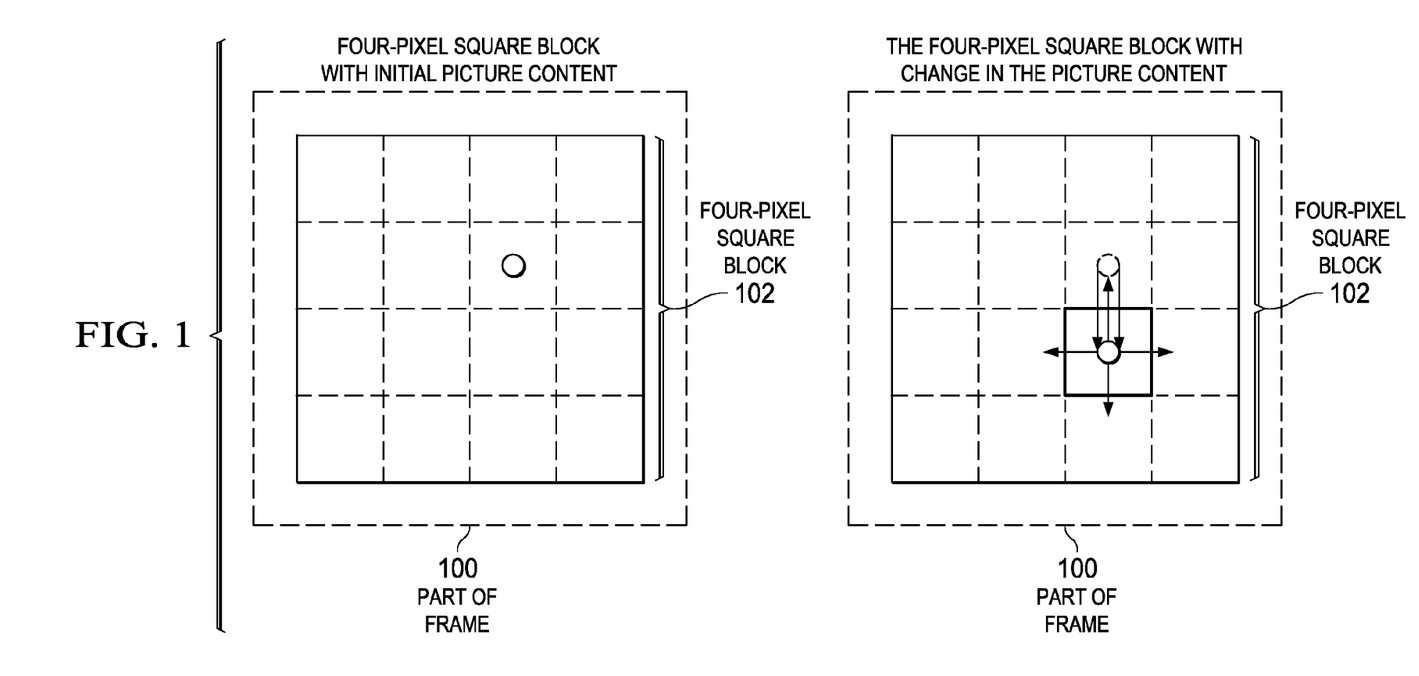
FIG. 1 is a partial frame view, illustrating the movement of picture content, according to one embodiment.

FIG. 1 is a partial frame view, illustrating the movement of a video content, according to one embodiment. Particularly, FIG. 1 illustrates a part of frame 100 and a four-pixel block 102, according to one embodiment.

The part of frame 100 may be an illustration of a part of frame which includes macro blocks (e.g., a sixteen-pixel macro block), the macro block includes four eight-pixel square blocks, and the eight-pixel square block includes four four-pixel blocks. The four-pixel block 102 may be a small entity of the frame containing a part of picture information.

In example embodiment, the FIG. 1, illustrates the four-pixel square block 102 having a part of a picture of the frame and the motion of the picture in the four-pixel square block 102. The picture moves down in the frame by a block as illustrated in the FIG. 1.

FIG. 2 is an exploding view of macro-block illustrating heterogeneity, according to one embodiment. Particularly, FIG. 2 illustrates the four-pixel square block 102, an eight-pixel square block 204 and a sixteen-pixel square block 206, according to one embodiment.

The eight-pixel square block 204 may show heterogeneous blocks, in which three four-pixel blocks may not show any variations in picture content, and the other four-pixel block may show variations in picture content. The sixteen-pixel square block 206 may show heterogeneous blocks, in which three eight-pixel blocks may not show any variations in picture content and the other eight-pixel block may show variations in picture content.

In example embodiment, FIG. 2 illustrates exploding heterogeneous sixteen-pixel square block in which an eight-pixel square block 204 is a heterogeneous (e.g., non-homogeneous block (NH) as illustrated in FIG. 2) other than rest of the eight-pixel square blocks which are homogeneous. The heterogeneous (e.g., non-homogeneous (NH) as illustrated in FIG. 2) eight-pixel block 204 illustrates exploding heterogeneous four-pixel block 102 and other homogenous four-pixel blocks. The four-pixel block illustrates change in picture content in few blocks which are termed as heterogeneous (e.g., illustrated as NH (non-homogeneous) of FIG. 2) blocks.

FIG. 3 is a system view illustrating process of intra prediction in a system, according to one embodiment. Particularly, FIG. 3 illustrates an intra-prediction module 300, a memory 302, a processor 304, a storage device 306, a classification module 308, a direction module 310, a testing module 312, and a selection module 314, according to one embodiment.

The intra-prediction module 300 may determine an optimal intra-prediction for observing, selecting and/or classifying the frames for further processing of an image. The memory 302 (e.g., RAM, etc.) may be device that is used to temporarily store data (e.g., media data, etc.) for further processing. The processor 304 may be a device which may process data (e.g., media data, etc.) based on requirements of intra-prediction module 300. The storage device 306 may be a device which is used to store information associated with data (e.g., media data, DC data, etc.). The classification module 308 may be used to classify blocks as homogeneous or heterogeneous. The direction module 310 may be used to determine the direction of the edge class of a particular region. The testing module 312 may be used for testing the edge classes when the blocks are found to be heterogeneous. The selection module 314 may be used to select the macro-blocks as homogeneous or heterogeneous based on the intra-prediction module 300 of FIG. 3.

In example embodiment, FIG. 3 illustrates the memory 302, the processor 304, the storage device 306 communicating with each other along with the intra-prediction module 300. The intra-prediction module 300 may include classification module 308, the direction module 310, the testing module 312, and the selection module 314 communicating with each other, according to one embodiment.

Figure 6:
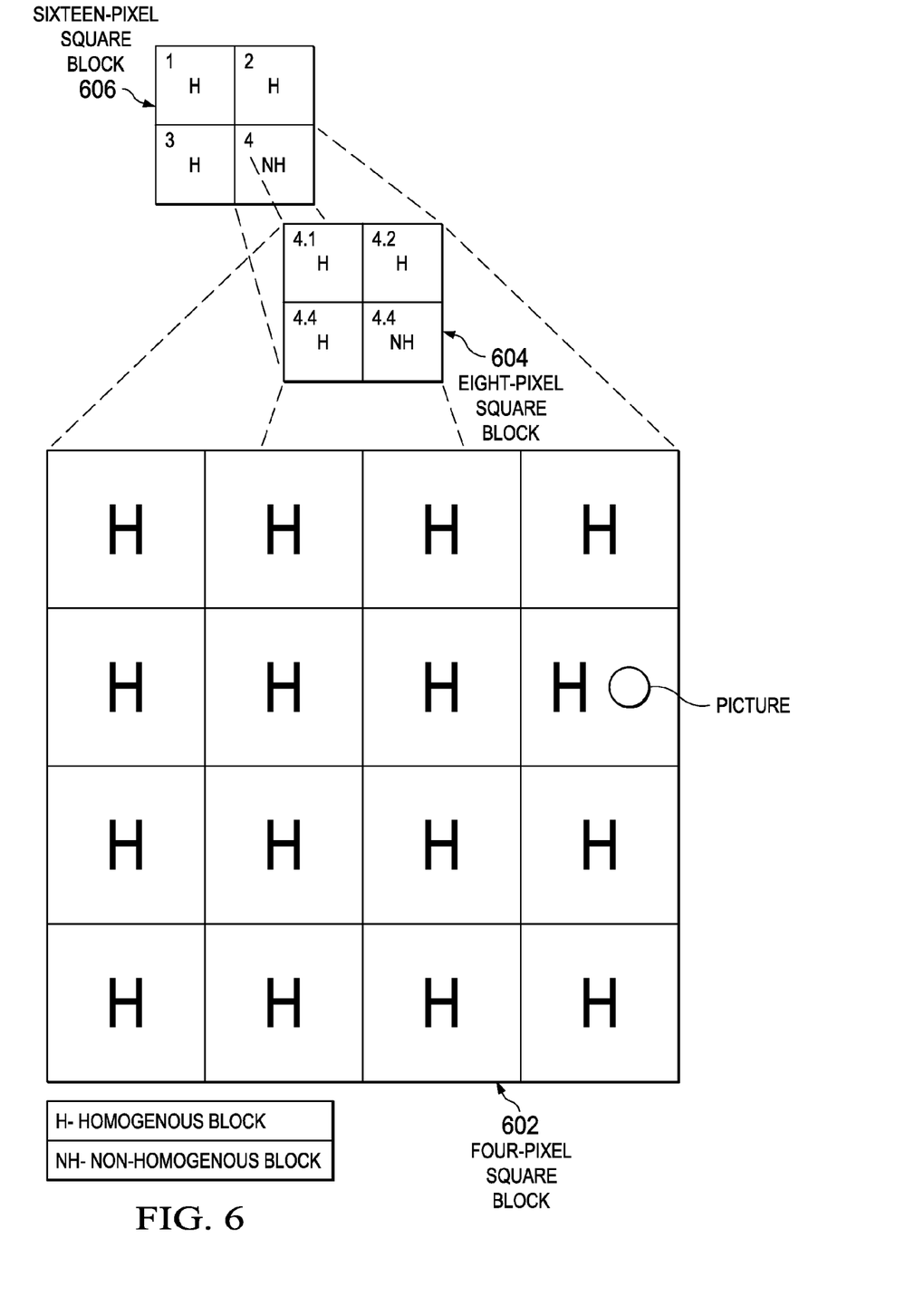
FIG. 6 is an explosion view of macro block illustrating homogeneity, according to one embodiment.

In one embodiment, the four-pixel square block 102 may be classified in an edge class based on an edge classifier (e.g., using a classification module 308 of FIG. 3). An eight-pixel square block (e.g., the eight pixel-square block 604 of FIG. 6) having a four-pixel square block (e.g., the four-pixel square block 602 of FIG. 6) and other four-pixel square blocks may be classified as a homogenous class (e.g., using the classification module 308 of FIG. 3) if the four-pixel square block 102 and the other four-pixel square blocks of the eight-pixel square block 204 belong to the edge class (e.g., as illustrated in FIG. 6). A direction may be assigned to the edge class (e.g., using the direction module 310 of FIG. 3) of the eight-pixel square block 604 (e.g., as illustrated in FIG. 6). An optimal intra-prediction type may be determined (e.g., using the intra-prediction module 300 of FIG. 3) through the classification such that empirical testing of all possible ones of the edge class (e.g., using the testing module 312 of FIG. 3) and the direction may be avoided when the homogenous class is identified.

A macro-block type may be selected as a sixteen-pixel square block (e.g., the sixteen-pixel square block 606 of FIG. 6) when the eight-pixel square block 604 and other eight-pixel square blocks forming the sixteen-pixel square block 606 are homogeneous and have the edge class (e.g., using the selection module 314 of FIG. 3). The edge class and the direction may be assigned to the sixteen-pixel square block without empirically testing of all possible ones of the edge class and the direction on the sixteen-pixel square block 206 and 606 (e.g., using the intra-prediction module 300 of FIG. 3). The sixteen-pixel square block direction may be used as the eight-pixel square block direction.

It may be observed that a sixteen-pixel square block (e.g., the sixteen-pixel block 206 and 606 of FIG. 2 and FIG. 6) may be preferred in a flat region of an image. It may be observed that a four-pixel square block (e.g., the four-pixel block 102 and 602 of FIG. 2 and FIG. 6) may be preferred in a high detail region of the image. It may be observed that a eight-pixel square block (e.g., the eight-pixel block 204 and 604 of FIG. 2 and FIG. 6) may be preferred in a moderate detail region of the image. A particular region of the image may be classified in the intra-prediction type (e.g., using the intra-prediction module 300 of FIG. 3) based on knowledge of whether the particular region may be the flat region, the high detail region, and/or the moderate detail region.

The macro-block type may be selected as the eight-pixel square block (e.g., the eight-pixel square block 204 of FIG. 2) when at least one of the other eight-pixel square blocks forming the sixteen-pixel square block (e.g., the sixteen-pixel square block 206 of FIG. 2) have a different edge class (e.g., using the selection module 314 of FIG. 3). The eight-pixel square block 204 having the four-pixel square block 102 and other four-pixel square blocks may be classified as a heterogeneous class (e.g., using the classification module 308 of FIG. 3) if the four-pixel square block 102 and the other four-pixel square blocks of the eight-pixel square block 204 do not belong to the edge class (e.g., as illustrated in FIG. 2). The macro-block type may be selected as the four-pixel square block 102 when the eight-pixel square block 204 may be classified in the heterogeneous class (e.g., using the selection module 314 of FIG. 3).

It may be determined that a sixteen-pixel square block (e.g., the sixteen-pixel square block 206 and 606 of FIG. 2 and FIG. 6) may be preferred in a flat region of an image. It may be determined that a four-pixel square block (e.g., the four-pixel square block 102 and 602 of FIG. 1 and FIG. 6) may be preferred in a high detail region of the image. It may be determined that a eight-pixel square block (e.g., the eight-pixel square block 204 and 604 of FIG. 2 and FIG. 6) may be preferred in a moderate detail region of the image. A particular region of the image may be classified in an intra-prediction type based on knowledge of whether the particular region may be the flat region, the high detail region, and/or the moderate detail region (e.g., using the intra-prediction module 300 of FIG. 3).

The intra-prediction type may determine an edge class and a direction of the edge class of the particular region (e.g., using the direction module 310 of FIG. 3). The four-pixel square block 102 may be classified in the edge class based on an edge classifier (e.g., using the classification module 308 of FIG. 3). A macro-block type may be selected (e.g., using the selection module 314 of FIG. 3) as the sixteen-pixel square block (e.g., the sixteen-pixel square block 606 of FIG. 6) when the eight-pixel square block (e.g., the eight-pixel square block 604 of FIG. 2) and other eight-pixel square blocks forming the sixteen-pixel square block (e.g., the sixteen-pixel square block 606 FIG. 6) are homogeneous (e.g., using the intra prediction module of FIG. 3) and have the edge class (e.g., as illustrated in FIG. 6).

The edge class and the direction may be assigned to the sixteen-pixel square block 606 (e.g., using the direction module 310 of FIG. 3) without empirically testing of all possible ones of the edge class and the direction on the sixteen-pixel square block 606 (e.g., using the testing module 312 of FIG. 3). The macro-block type may be selected as the eight-pixel square block 204 when the other eight-pixel square blocks forming the sixteen-pixel square block 206 have a different edge class (e.g., using the selection module 314 of FIG. 3). The eight-pixel square block 204 may be classified having the four-pixel square block 102 and other four-pixel square blocks as a heterogeneous class if the four-pixel square block 102 and the other four-pixel square blocks of the eight-pixel square block 204 do not belong to the edge class (e.g. using the classification module 308 of FIG. 3).

A macro-block type may be selected (e.g., using the selection module 314 of FIG. 3) as the four-pixel square block 102 when the eight-pixel square block 204 may be classified (e.g., using the classification module 308 of FIG. 3) in the heterogeneous class (e.g., as illustrated in FIG. 2). A processor (e.g., the processor 304 of FIG. 3) may be communicatively coupled to a memory (e.g., the memory 302 of FIG. 3) and a storage device (e.g., the storage device 306 of FIG. 3). The intra-prediction module 300 may be associated with the processor 304 may classify the four-pixel square block 102 in an edge class based on an edge classifier (e.g., using the classification module 308 of FIG. 3). The intra-prediction module 300 may classify an eight-pixel square block 604 having the four-pixel square block 602 and other four-pixel square blocks as a homogenous class if the four-pixel square block 602 and the other four-pixel square blocks of the eight-pixel square block 604 belong to the edge class (e.g., using the classification module 308 of FIG. 3), and may assign a direction to the edge class of the eight-pixel square block (e.g., using the direction module 310 of FIG. 3).

The intra-prediction module 300 may determine an optimal intra-prediction type through the classification such that empirical testing of all possible ones of the edge class and the direction may be avoided when the homogenous class is identified. The intra-prediction module 300 may select (e.g., using the selection module 314 of FIG. 3) a macro-block type as a sixteen-pixel square block (e.g., the sixteen-pixel square block 606 of FIG. 6) when the eight-pixel square block 604 and other eight-pixel square blocks forming the sixteen-pixel square block 606 are homogeneous and have the edge class. The intra-prediction module 300 may assign the edge class and the direction to the sixteen-pixel square block 606 without empirically testing of all possible ones of the edge class and the direction on the sixteen-pixel square block (e.g., using the classification module 308 of FIG. 3).

The intra-prediction module 300 may observe that the sixteen-pixel square block (e.g., the sixteen-pixel square block 206 and 606 of FIG. 2 and FIG. 6) may be preferred in a flat region, a four-pixel square block (e.g., the four-pixel square block 102 and 606 of FIG. 1 and FIG. 6) may be preferred in a high detail region, a eight-pixel square block (e.g., the eight-pixel square block 204 and 604 of FIG. 2 and FIG. 6) may be preferred in a moderate detail region of the image. The intra-prediction module 300 may classify (e.g., using the classification module 308 of FIG. 3) a particular region of the image in the intra-prediction type based on knowledge of whether the particular region may be the flat region, the high detail region, and/or the moderate detail region.

Figure 4:
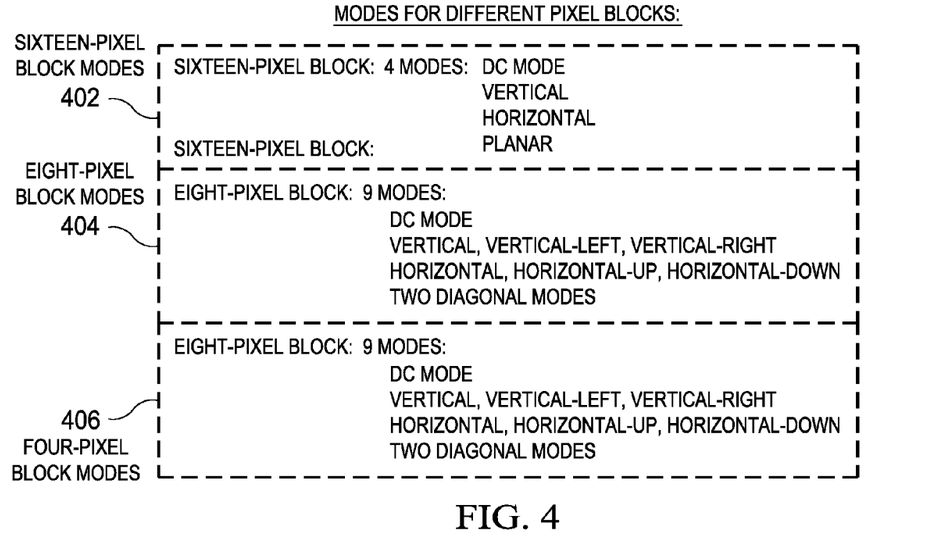
FIG. 4 illustrates various edge classes and directions used for determining an optimal intra-prediction type for different pixel blocks, according to one embodiment.

FIG. 4 illustrates various edge classes and modes used for determining an optimal intra-prediction type for different pixel blocks, according to one embodiment. Particularly, FIG. 4 illustrates sixteen-pixel block modes 402, eight-pixel block modes 404, and four-pixel block modes 406, according to one embodiment.

The sixteen-pixel block modes 402 may include four edge classes for determining an optimal intra-prediction type. The eight-pixel block may have nine modes for determining an optimal intra-prediction type. The four-pixel block may have nine modes for determining an optimal intra-prediction type.

In example embodiment, FIG. 4 illustrates various directions for intra-prediction for different pixel blocks. The sixteen-pixel block modes 402 may include DC mode, a vertical direction, a horizontal direction and a planar mode for determining an optimal intra-prediction type. The eight-pixel block modes 404 may include DC mode, a vertical direction, a vertical-left direction, a vertical-right direction, a horizontal direction, a horizontal-up direction, a horizontal-down direction and a left diagonal direction and a right diagonal direction for determining an optimal intra-prediction type. The four-pixel block modes 406 may include DC mode, a vertical direction, a vertical-left direction, a vertical-right direction, a horizontal direction, a horizontal-up direction, a horizontal-down direction and a left diagonal direction and a right diagonal direction for determining an optimal intra-prediction type, according to one embodiment.

In one embodiment, the edge class may be a DC edge class, a vertical edge class, a horizontal edge class, a diagonal edge class, and a planar edge class (e.g., as illustrated in FIG. 4).

Figure 5:
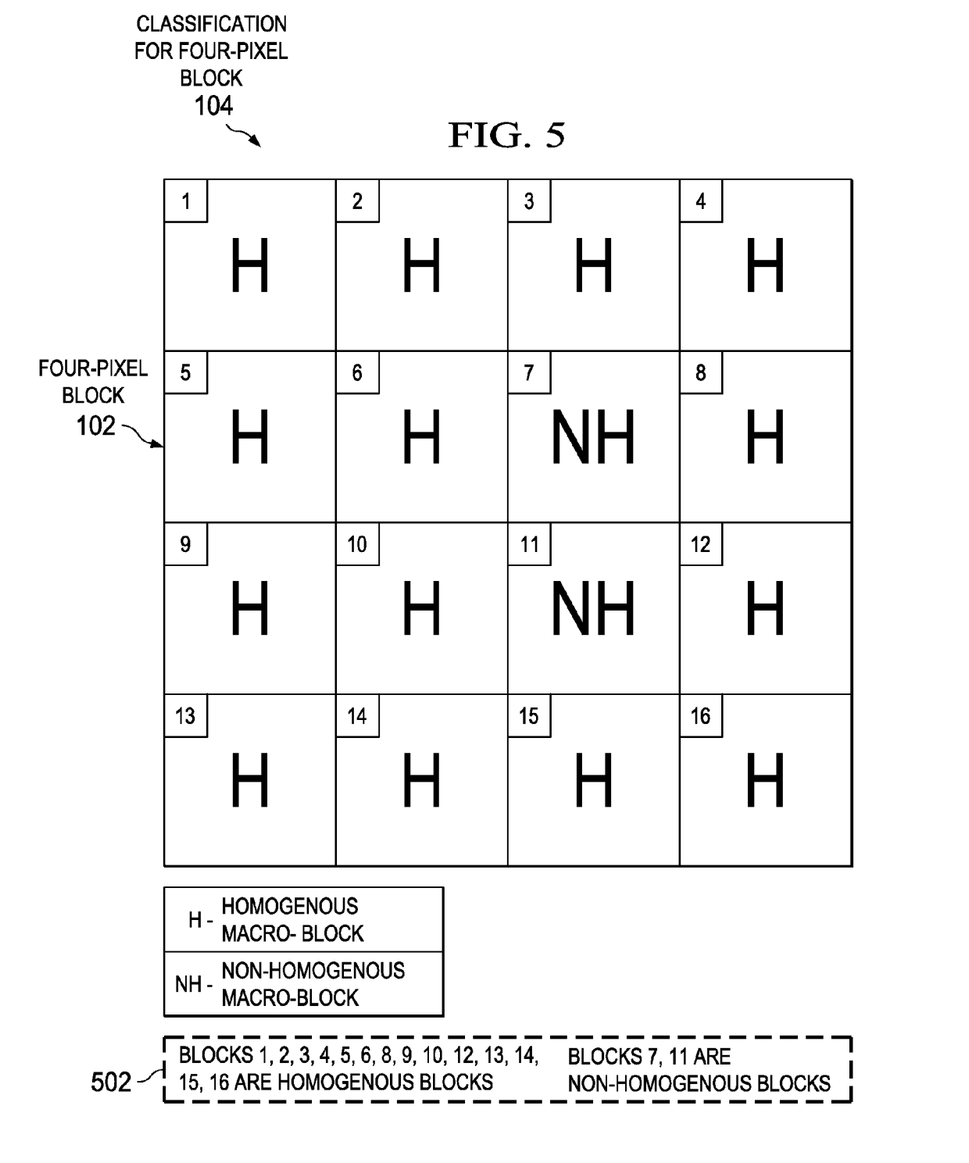
FIG. 5 illustrates classification of homogeneous and heterogeneous for four-pixel square block 102, according to one embodiment.

FIG. 5 illustrates classification of homogeneous and heterogeneous (e.g., non-homogeneous (NH)) for four-pixel square block 102, according to one embodiment. Particularly, FIG. 5, illustrates the four-pixel block 102, and a block 502 according to one embodiment.

The four-pixel block 102 may illustrate the edge classes which may be homogeneous (H) and non-homogeneous (e.g., heterogeneous (NH)). The block 502 may classify blocks which are homogeneous and which are non-homogeneous (e.g., heterogeneous).

In example embodiment, FIG. 5 illustrates shows blocks numbered from 1 to 16, which may be homogenous blocks or non-homogeneous blocks. The four-pixel block has two blocks which are non-homogeneous (e.g., block 7 and block 11). Rest of the remaining blocks are homogenous blocks according to one embodiment. The homogenous blocks are the blocks in which there may not be any change in content of the blocks (e.g., change in content picture). The non-homogenous blocks (e.g., heterogeneous block (NH)) are the blocks in which there may be changes in content of blocks (e.g., change in content picture). The picture content may move from different blocks as illustrated or the picture content itself may change.

FIG. 6 is an exploding view of macro-block illustrating homogeneity, according to one embodiment. Particularly, FIG. 6 illustrates the four-pixel square block 602, an eight-pixel square block 604, a sixteen-pixel square block 606, according to one embodiment.

The eight-pixel square block 604 may show homogenous blocks, in which all four, four-pixel blocks may not show any variations in picture content. The sixteen-pixel square block

606 may show homogeneous blocks, in which all four eight-pixel blocks may not show any variations in picture content.

In example embodiment, FIG. 6 illustrates exploding homogenous sixteen-pixel square block 606 in which all eight-pixel square blocks are homogenous. The homogenous eight-pixel block 604 may illustrate exploding homogenous four-pixel blocks 602. There is no change in picture content in blocks and are same as in previous frame.

Figure 7:
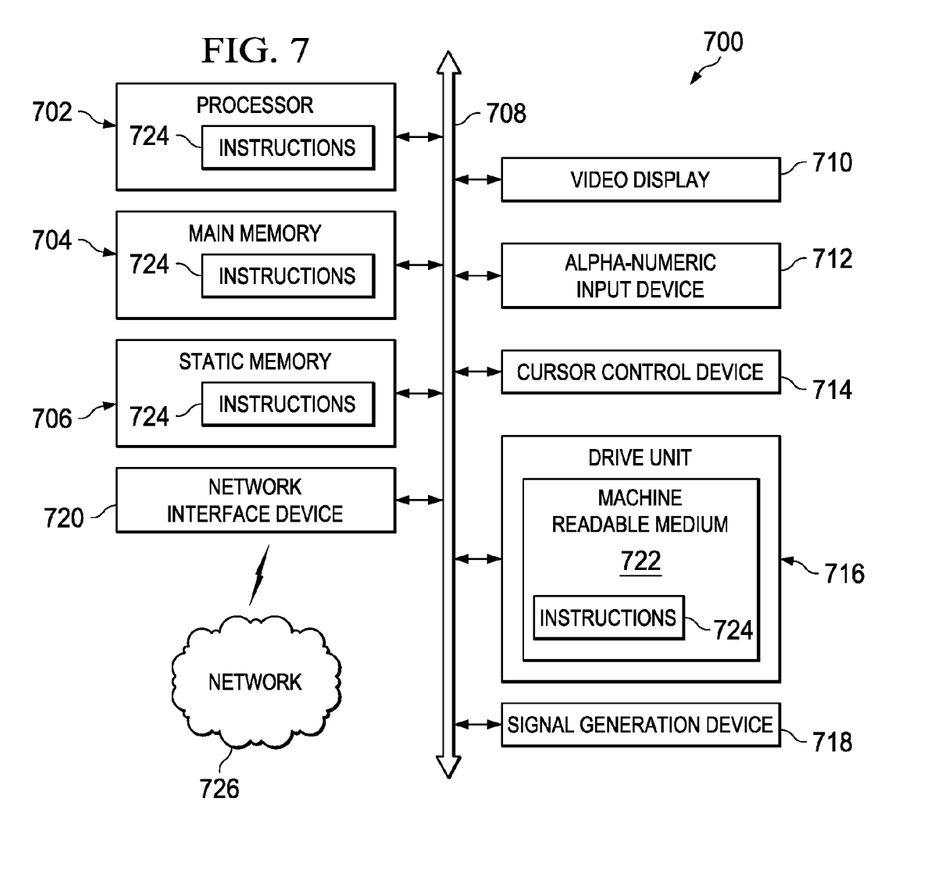
FIG. 7 is a diagrammatic system view of a data processing system in which any of the embodiments disclosed herein may be performed, according to one embodiment.

FIG. 7 is a diagrammatic system view 700 of a data processing system in which any of the embodiments disclosed herein may be performed, according to one embodiment. Particularly, the diagrammatic system view 700 of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724, and a network 726, according to one embodiment.

The diagrammatic system view 700 may indicate a personal computer and the data processing system in which one or more operations disclosed herein are performed. The processor 702 may be a microprocessor, a state machine, an application specific integrated circuit, a field programmable gate array, etc. (e.g., Intel® Pentium® processor). The main memory 704 may be a dynamic random access memory and/or a primary memory of a computer system.

The static memory 706 may be a hard drive, a flash drive, and/or other memory information associated with the data processing system. The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically challenged). The cursor control device 714 may be a pointing device such as a mouse.

The drive unit 716 may be the hard drive, a storage system, and/or other longer term storage subsystem. The signal generation device 718 may be a bios and/or a functional operating system of the data processing system. The network interface device 720 may be a device that may perform interface functions such as code conversion, protocol conversion and/or buffering required for communication to and from the network 726. The machine readable medium 722 may provide instructions on which any of the methods disclosed herein may be performed. The instructions 724 may provide source code and/or data code to the processor 702 to enable any one/or more operations disclosed herein.

Figure 8A:
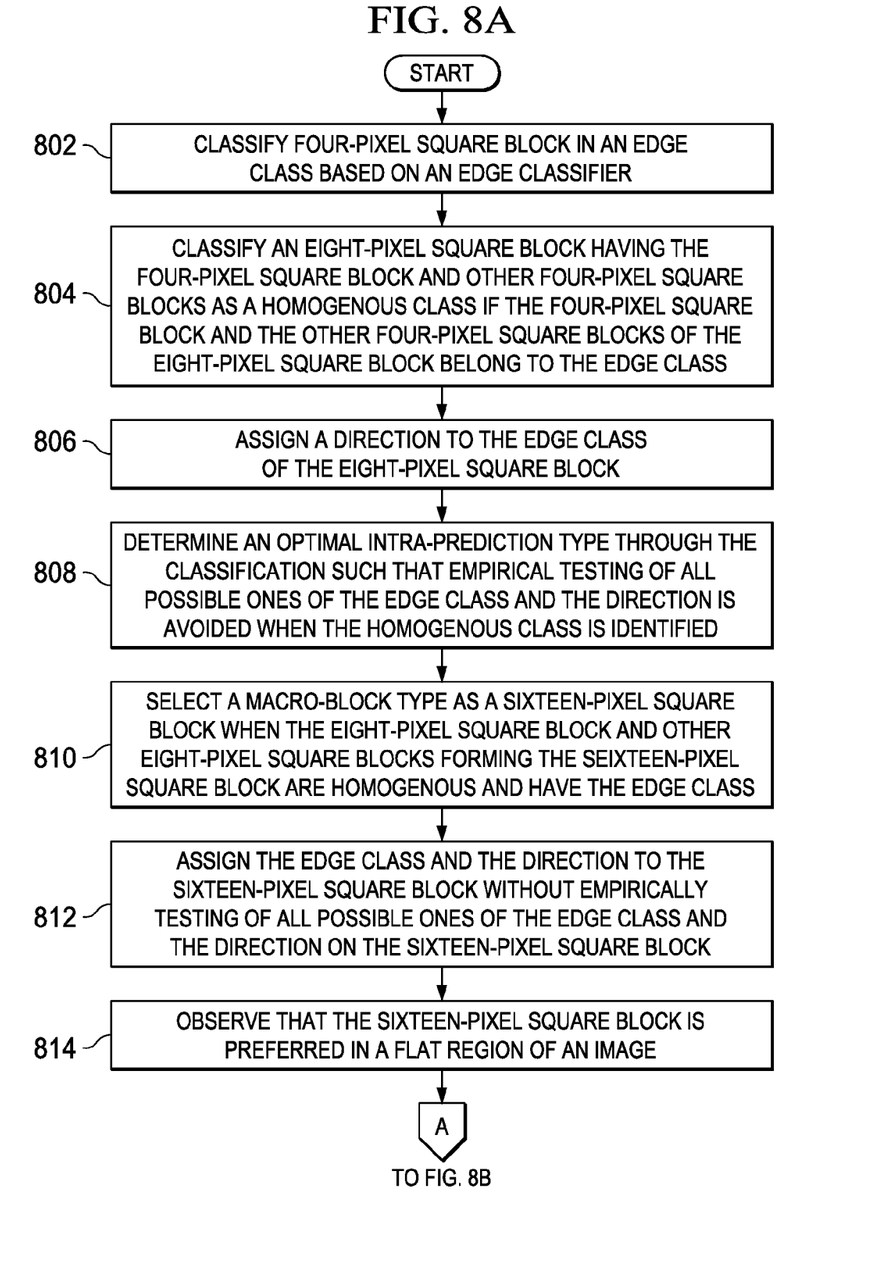
FIG. 8A is a process flow of classifying a four-pixel square block (e.g., the four-pixel square block 602 of FIG. 6) in an edge class based on an edge classifier, according to one embodiment.

FIG. 8A is a process flow of classifying a four-pixel square block (e.g., the four-pixel square block 602 of FIG. 6) in an edge class based on an edge classifier, according to one embodiment. In operation 802, the four-pixel square block (e.g., the four-pixel square block 602 of FIG. 6) may be classified in an edge class based on an edge classifier (e.g., using the classification module 308 of FIG. 3). In operation 804, an eight-pixel square block (e.g., the eight-pixel square block 604 of FIG. 6) having the four-pixel square block 602 and other four-pixel square blocks may be classified as a homogenous class (e.g., using the classification module 308 of FIG. 3) if the four-pixel square block 602 and the other four-pixel square blocks of the eight-pixel square block 604 belong to the edge class. In operation 806, a direction may be assigned (e.g., using the direction module 310 of FIG. 3) to the edge class of the eight-pixel square block 604. In operation 808, an optimal intra-prediction type may be determined (e.g., using the intra-prediction module 300 of FIG. 3) through the classification (e.g., using classification module 308 of FIG. 3) such that an empirical testing of all possible ones of the edge class and the direction is avoided when the homogenous class is identified.

The edge class may be a DC edge class, a vertical edge class, a horizontal edge class, a diagonal edge class, and/or a planar edge class.

In operation 810, a macro-block type may be selected (e.g., using the selection module 314 of FIG. 3) as a sixteen-pixel square block 606 when the eight-pixel square block 604 and other eight-pixel square blocks forming the sixteen-pixel square block 606 are homogeneous and may have the edge class. In operation 812, the edge class and the direction may be assigned to the sixteen-pixel square block 606 without empirically testing of all possible ones of the edge class and the direction on the sixteen-pixel square block 606 (e.g., using the intra-prediction module 300 of FIG. 3) and the sixteen-pixel square block direction may be used as the eight-pixel square block direction. In operation 814, it may be observed that the sixteen-pixel square block 606 is preferred in a flat region of an image.

Figure 8B:
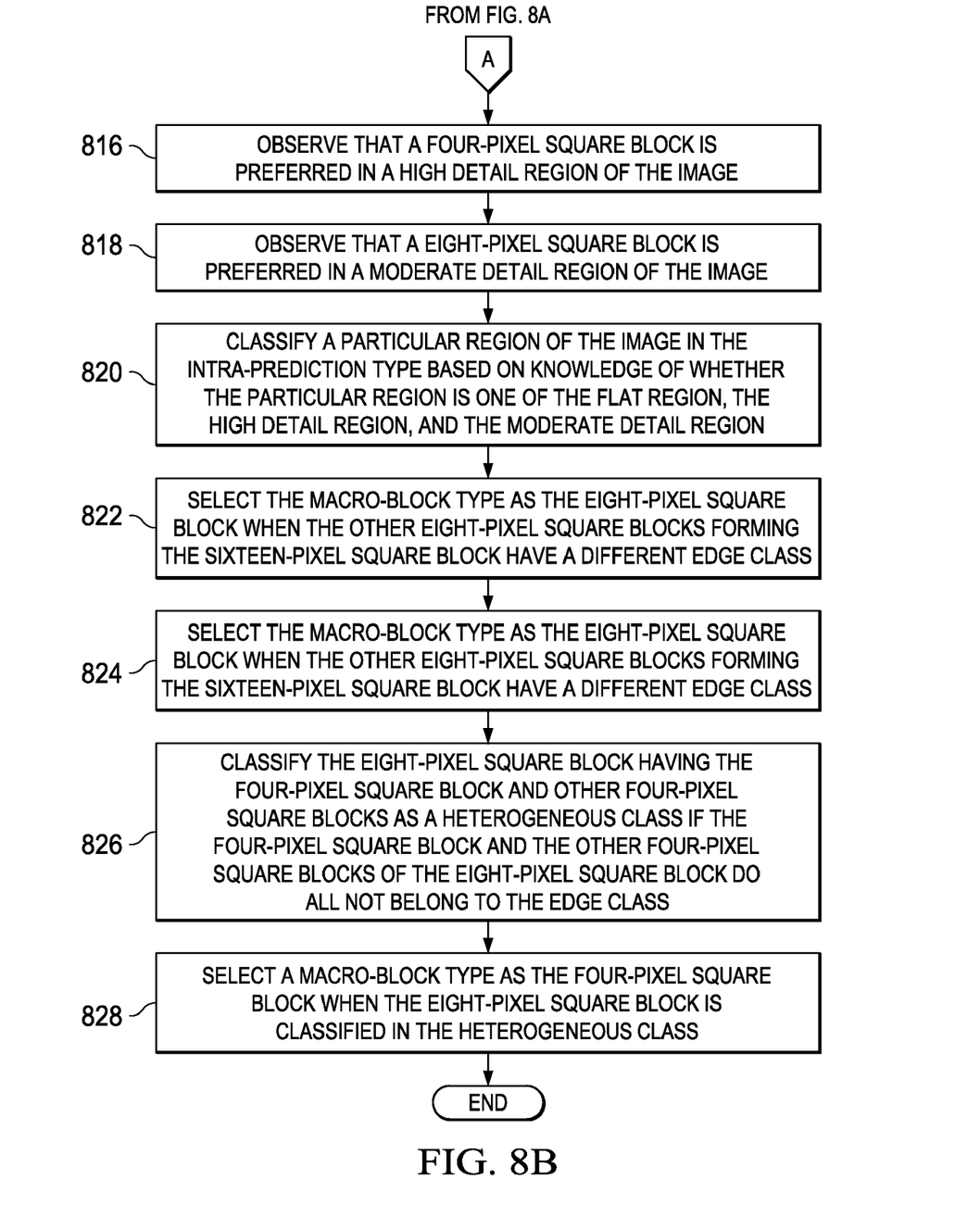
FIG. 8B is a continuation of process flow of FIG. 8A, illustrating additional processes, according to one embodiment.

FIG. 8B is a continuation of process flow of FIG. 8A, illustrating additional processes, according to one embodiment. In operation 816, it may be observed that a four-pixel square block 602 is preferred in a high detail region of the image. In operation 818, it may be observed that an eight-pixel square block 604 is preferred in a moderate detail region of the image. In operation 820, a particular region of the image may be classified (e.g., using the classification module 308 of FIG. 3) in the intra-prediction type based on knowledge of whether the particular region may be the flat region, the high detail region, and/or the moderate detail region (e.g., using the intra-prediction module 300 of FIG. 3).

In operation 822, the macro-block type may be selected (e.g., using the selection module 314 of FIG. 3) as the eight-pixel square block 204 when the other eight-pixel square blocks 204 forming the sixteen-pixel square block 206 have a different edge class. In operation 826, the eight-pixel square block 204 having the four-pixel square block 102 and other four-pixel square blocks may be classified as a heterogeneous class (e.g., using the classification module 308 of FIG. 3) if the four-pixel square block 102 and the other four-pixel square blocks of the eight-pixel square block 204 do all not belong to the edge class. In operation 828, a macro-block type may be selected (e.g., using the selection module 314 of FIG. 3) as the four-pixel square block 102 when the eight-pixel square block 204 is classified in the heterogeneous class.

Figure 9A:
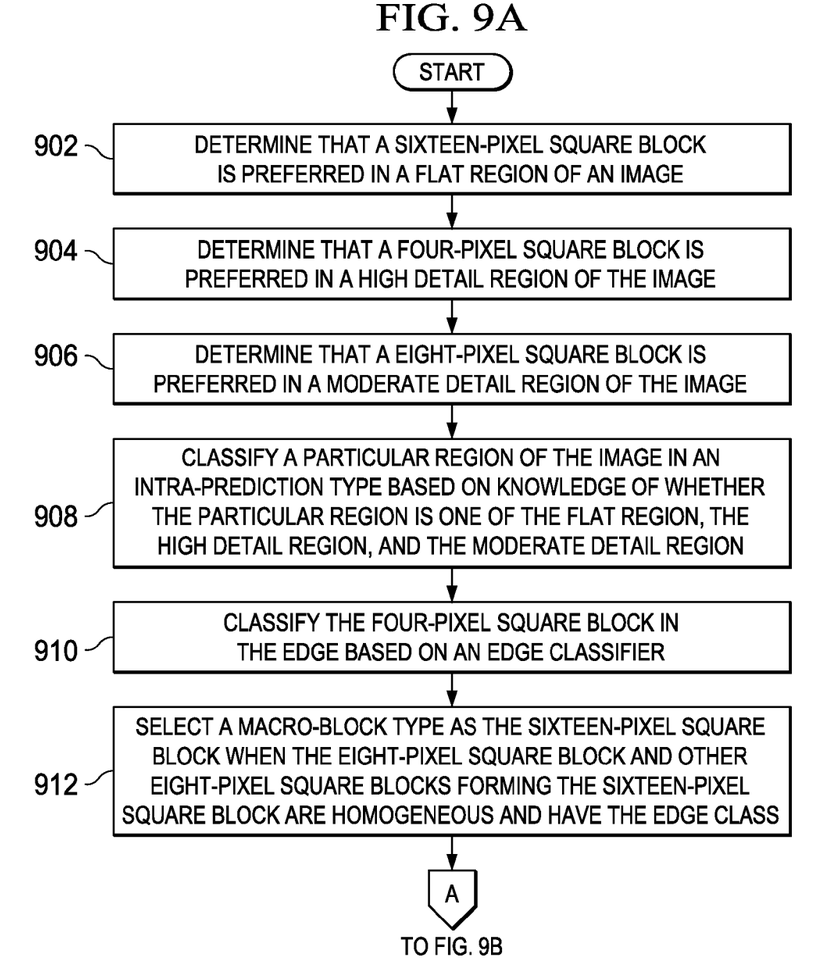
FIG. 9A is a process flow of classifying a particular region of the image in an intra-prediction type based on knowledge of the particular region, according to one embodiment.

FIG. 9A is a process flow of classifying a particular region of the image in an intra-prediction type based on knowledge of the particular region, according to one embodiment. In operation 902, it may be determined that a sixteen-pixel square block (e.g., the sixteen-pixel square block 206 and 606 of FIG. 2 and FIG. 6) is preferred in a flat region of an image. In operation 904, it may be determined that a four-pixel square block (e.g., the four-pixel square block 102 and 602 of FIG. 1 and FIG. 6) is preferred in a high detail region of the image. In operation 906, it may be determined that a eight-pixel square block (e.g., the eight-pixel square block 204 and 604 of FIG. 2 and FIG. 6) is preferred in a moderate detail region of the image. In operation 908, a particular region of the image may be classified (e.g., using the classification module 308 of FIG. 3) in an intra-prediction type based on knowledge of whether the particular region may be the flat region, the high detail region, and/or the moderate detail region (e.g., using the classification module 308 of FIG. 3).

The intra-prediction type may determine an edge class and a direction of the edge class of the particular region (e.g., using the intra-prediction module 300 of FIG. 2). The edge class may be a DC edge class, a vertical edge class, a horizontal edge class, a diagonal edge class, and/or a planar edge class. In operation 910, the four-pixel square block 102 and 602 may be classified (e.g., using the classification module 308 of FIG. 3) in the edge class based on an edge classifier. In operation 912, a macro-block type may be selected (e.g., using the selection module 314 of FIG. 3) as the sixteen-pixel square block 606 when the eight-pixel square block 604 and other eight-pixel square blocks 204 forming the sixteen-pixel square block 606 are homogeneous and have the edge class.

Figure 9B:
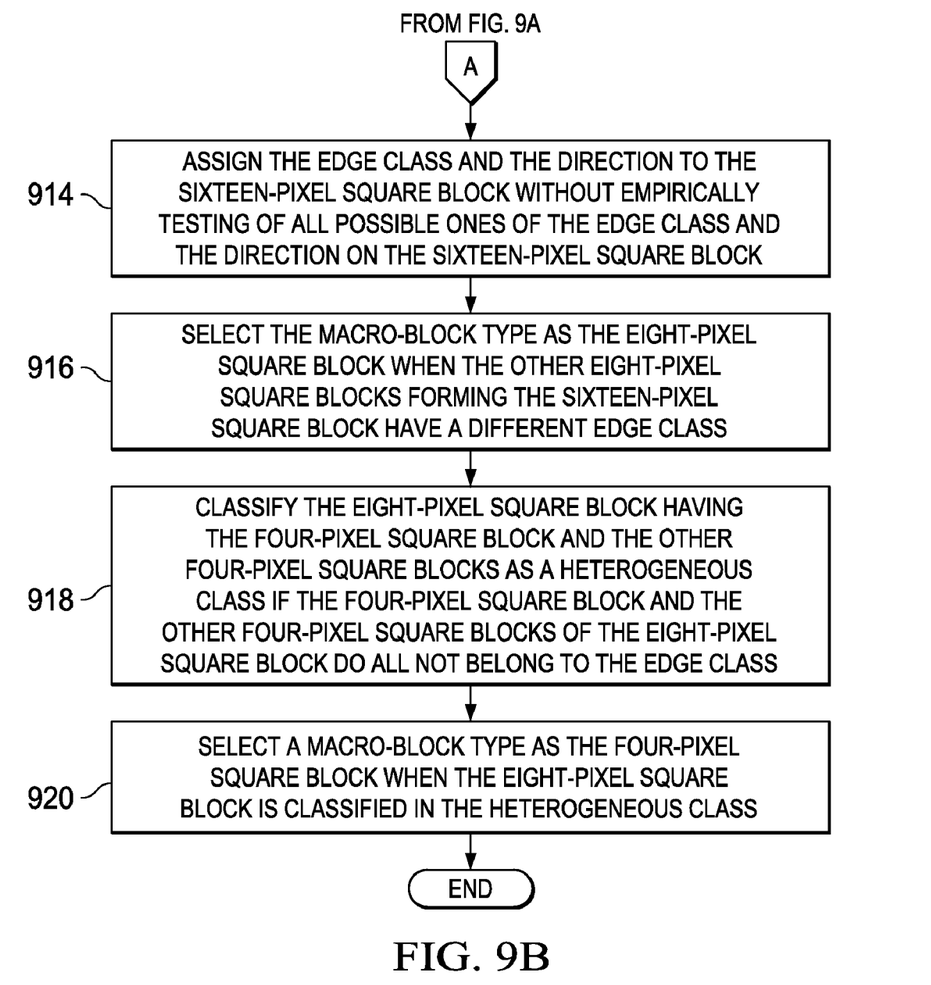
FIG. 9B is a continuation of process flow of FIG. 9A, illustrating additional processes, according to one embodiment.

FIG. 9B is a continuation of process flow of FIG. 9A, illustrating additional processes, according to one embodiment. In operation 914, the edge class and the direction may be assigned to the sixteen-pixel square block 606 without empirically testing of all possible edge class and the direction on the sixteen-pixel square block (e.g., using the intra-prediction module 300 of FIG. 3). In operation 916, the macro-block type may be selected (e.g., using the selection module 314 of FIG. 3) as the eight-pixel square block 602 when the other eight-pixel square blocks forming the sixteen-pixel square block 606 have a different edge class.

In operation 918, the eight-pixel square block 204 having the four-pixel square block 204 and other four-pixel square blocks may be classified (e.g., using the classification module 308 of FIG. 3) as a heterogeneous class if the four-pixel square block 102 and the other four-pixel square blocks of the eight-pixel square block 204 do all not belong to the edge class. In operation 920, a macro-block type may be selected (e.g., using the selection module 314 of FIG. 3) as the four-pixel square block 102 when the eight-pixel square block 204 is classified in the heterogeneous class.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structures and methods may be embodied using transistors, logic gates, and electrical circuits (e.g., Application Specific Integrated (ASIC) Circuitry and/or in Digital Signal Processor (DSP) circuitry).

Particularly, the intra-prediction module 300, the classification module 308, the direction module 310, the testing module 312, the selection module 314 may be enabled using software and/or using transistors, logic gates, and electrical circuits (e.g., application specific integrated ASIC circuitry) such as a intra-prediction circuit, classification circuit, a direction circuit, a testing circuit, a selection circuit, and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of video data processing comprising:
receiving pixel data representing a video frame;
determining an edge class for each four-pixel square block of a video frame;
determining an eight-pixel square block including four four-pixel square blocks is homogeneous if each included four-pixel square block has a same edge class;
determining an edge class for a homogeneous eight-pixel square blocks as the edge class of the included four-pixel square blocks without empirically testing all possible edge classes of the eight-pixel square block;
determining a sixteen-pixel square block including four eight-pixel square blocks is homogeneous if each included eight-pixel square block has a same edge class;
determining an edge class for a homogeneous sixteen-pixel square blocks as the edge class of the included eight-pixel square blocks without empirically testing all possible edge classes of the sixteen-pixel square block;
selecting a sixteen-pixel square macro-block type for intra-mode prediction of a sixteen-pixel square block for each homogeneous sixteen-pixel square block;
selecting a eight-pixel macro-block type for intra-mode prediction of an eight-pixel square block for each homogeneous eight-pixel square block;
selecting a four-pixel square macro-block type for intra-mode predition of a four-pixel square block for each four-pixel square block not included in a homogeneous eight-pixel square block and not included in a homogeneous sixteen-pixel square block;
generating an intra-mode prediction for the video frame based upon the selected macro-block type of a corresponding portion of the video frame; and
transmitting the intra-mode prediction data for the video frame.

2. The method of video data compression of claim 1, wherein:
said step of determining an edge class for each four-pixel square block of a video frame determines one of a DC edge class, a vertical edge class, a horizontal edge class, a diagonal edge class and an planar edge class.

3. The method of video data compression of claim 1, wherein:
said step of determining an edge class for each four-pixel square block of a video frame determines one of a DC edge class, a vertical edge class, a vertical-left edge class, a vertical-right edge class, a horizontal edge class, a horizontal-up edge class, a horizontal-down edge class, a left diagonal edge class and a right diagonal edge class.

4. The method of video data compression of claim 1, wherein:
said step of determining an edge class for each homogeneous eight-pixel square block of a video frame determines one of a DC edge class, a vertical edge class, a vertical-left edge class, a vertical-right edge class, a horizontal edge class, a horizontal-up edge class, a horizontal-down edge class, a left diagonal edge class and a right diagonal edge class.

5. The method of video data compression of claim 1, wherein:
said step of determining an edge class for each homogeneous sixteen-pixel square block of a video frame determines one of a DC edge class, a vertical edge class, a horizontal edge class and a planar edge class.

6. A video data processing apparatus comprising:
a programmable data processor;
a main memory connected to said programmable data processor;
a static memory connected to said programmable data processor, said static memory storing instructions operable to control said programmable data processor to determine an edge class for each four-pixel square block of a video frame;

determine an eight-pixel square block including four four-pixel square blocks is homogeneous if each included four-pixel square block has a same edge class;

determine an edge class for a homogeneous eight-pixel square blocks as the edge class of the included four-pixel square blocks without empirically testing all possible edge classes of the eight-pixel square block;

determine a sixteen-pixel square block including four eight-pixel square blocks is homogeneous if each included eight-pixel square block has a same edge class;

determine an edge class for a homogeneous sixteen-pixel square blocks as the edge class of the included eight-pixel square blocks without empirically testing all possible edge classes of the sixteen-pixel square block;

select a sixteen-pixel square macro-block type for intra-mode prediction of a sixteen-pixel square block for each homogeneous sixteen-pixel square block;

select a eight-pixel macro-block type for intra-mode prediction of an eight-pixel square block for each homogeneous eight-pixel square block;

select a four-pixel square macro-block type for intra-mode predition of a four-pixel square block for each four-pixel square block not included in a homogeneous eight-pixel square block and not included in a homogeneous sixteen-pixel square block; and generate an intra-mode prediction for the video frame based upon the selected macro-block type of a corresponding portion of the video frame.

7. The video data processing apparatus of claim 6, wherein:
said instructions stored in said static memory further controls said programmable data processor to determine an edge class for each four-pixel square block of a video frame of one of a DC edge class, a vertical edge class, a horizontal edge class, a diagonal edge class and an planar edge class.

8. The video data processing apparatus of claim 6, wherein:
said instructions stored in said static memory further controls said programmable data processor to determine an edge class for each four-pixel square block of a video frame of a selected one of a DC edge class, a vertical edge class, a vertical-left edge class, a vertical-right edge class, a horizontal edge class, a horizontal-up edge class, a horizontal-down edge class, a left diagonal edge class and a right diagonal edge class.

9. The video data processing apparatus of claim 6, wherein:
said instructions stored in said static memory further controls said programmable data processor to determine an edge class for each homogeneous eight-pixel square block of a video frame of a selected one of a DC edge class, a vertical edge class, a vertical-left edge class, a vertical-right edge class, a horizontal edge class, a horizontal-up edge class, a horizontal-down edge class, a left diagonal edge class and a right diagonal edge class.

10. The video data processing apparatus of claim 6, wherein:
said instructions stored in said static memory further controls said programmable data processor to determine an edge class for each homogeneous sixteen-pixel square block of a video frame of a selected one of a DC edge class, a vertical edge class, a horizontal edge class and a planar edge class.

* * * * *